US012697645B2

(12) United States Patent
Arkenljung

(10) Patent No.: US 12,697,645 B2
(45) Date of Patent: Aug. 4, 2026

(54) CLEANING FABRIC AND RELATED APPARATUS AND METHODS

(71) Applicant: BW Converting AB, Arlöv (SE)

(72) Inventor: Ulf Arkenljung, Malmö (SE)

(73) Assignee: BW Converting AB, Arlöv (SE)

( * ) Notice: Subject to any disclaimer, the term of this patent is extended or adjusted under 35 U.S.C. 154(b) by 12 days.

(21) Appl. No.: 18/713,995

(22) PCT Filed: Dec. 19, 2022

(86) PCT No.: PCT/EP2022/086597
§ 371 (c)(1),
(2) Date: May 28, 2024

(87) PCT Pub. No.: WO2023/117867
PCT Pub. Date: Jun. 29, 2023

(65) Prior Publication Data
US 2024/0351073 A1      Oct. 24, 2024

(30) Foreign Application Priority Data
Dec. 22, 2021    (SE) .................................. 2151608-3

(51) Int. Cl.
| | |
|---|---|
| *B08B 1/14* | (2024.01) |
| *B08B 1/20* | (2024.01) |
| *B08B 1/30* | (2024.01) |
| *B32B 5/02* | (2006.01) |
| *B32B 5/26* | (2006.01) |
| *B32B 7/02* | (2019.01) |

(Continued)

(52) U.S. Cl.
CPC ................ *B08B 1/143* (2024.01); *B08B 1/20* (2024.01); *B08B 1/30* (2024.01); *B32B 5/022* (2013.01); *B32B 5/024* (2013.01); *B32B 5/26* (2013.01); *B32B 7/02* (2013.01); *B32B 27/12* (2013.01); *B41F 35/00* (2013.01); *B32B 2250/20* (2013.01); *B32B 2260/023* (2013.01); *B32B 2260/04* (2013.01); *B32B 2307/726* (2013.01); *B32B 2432/00* (2013.01)

(58) Field of Classification Search
CPC ....... B32B 2260/023; B32B 5/22; B32B 5/24; B32B 5/26; B08B 1/20; B08B 1/143
See application file for complete search history.

(56) References Cited

U.S. PATENT DOCUMENTS

| | | |
|---|---|---|
| 5,049,944 A | 9/1991 | DeBolt et al. |
| 5,649,130 A | 7/1997 | Nakajima et al. |
| (Continued) | | |

FOREIGN PATENT DOCUMENTS

| | | |
|---|---|---|
| DE | 10361066 A1 | 7/2005 |
| DE | 102008004795 A1 | 7/2009 |
| (Continued) | | |

*Primary Examiner* — Andrew A Horton
(74) *Attorney, Agent, or Firm* — Thompson Coburn LLP

(57) ABSTRACT

A printing system cleaning fabric (13), having a first layer (131) with a first cleaning surface (131'), and a second layer (132) with a second cleaning surface (1321) facing away therefrom. The first and second layers (131, 132) extend parallel to each other and have a respective inner surface (131", 132") attached to the other along an extension of the cleaning fabric (13). The first and second layers (131, 132) have different permeability characteristics.

15 Claims, 5 Drawing Sheets

(51) Int. Cl.
    B32B 27/12         (2006.01)
    B41F 35/00         (2006.01)

(56)            References Cited

U.S. PATENT DOCUMENTS

| | | | |
|---|---|---|---|
| 5,974,976 A | 11/1999 | Gasparrini et al. | |
| 9,862,180 B2 | 1/2018 | DeMoore et al. | |
| 2006/0188317 A1* | 8/2006 | Schwarz | A46B 3/00 |
| | | | 401/123 |
| 2013/0269134 A1* | 10/2013 | Lin | B32B 5/028 |
| | | | 15/208 |
| 2021/0016327 A1* | 1/2021 | Atake | B08B 1/30 |

FOREIGN PATENT DOCUMENTS

| | | | |
|---|---|---|---|
| EP | 0414909 A1 | 3/1991 | |
| EP | 0590833 A1 | 4/1994 | |
| EP | 0741035 A1 | 11/1996 | |
| EP | 1076609 A1 | 2/2001 | |
| EP | 1458501 A1 | 9/2004 | |
| EP | 1738908 A2 | 1/2007 | |
| EP | 1815987 A2 | 8/2007 | |
| EP | 1848590 A1 | 10/2007 | |
| EP | 3582970 A1 | 12/2019 | |
| FR | 2353265 A1 | 12/1977 | |
| JP | H10131022 A | 5/1998 | |
| JP | H11254656 A | 9/1999 | |
| JP | 2007090580 A | 4/2007 | |
| JP | 4058066 B2 | 3/2008 | |
| WO | 2006089179 A1 | 8/2006 | |
| WO | 2020035499 A1 | 2/2020 | |

* cited by examiner

CLEANING FABRIC AND RELATED APPARATUS AND METHODS

RELATED APPLICATION DATA

The following application in a national stage entry of WO 2023/117867 (PCT/EP2022/086597) having a international filing date of Dec. 19, 2022, which claims priority benefit to Swedish patent application serial no. SE 2151608-3, filed on Dec. 22, 2021, the disclosures of which are incorporated by reference herein.

TECHNICAL FIELD

The present invention relates in general to an improved printing system cleaning fabric, a printing system cleaning machine, a roll of cleaning fabric to be used in said machine, and a method of cleaning with such a cleaning machine.

BACKGROUND

Surfaces of cylinders and rolls in a printing machine are often cleaned by means of cleaning fabrics impregnated with a cleaning liquid. Typically, the cleaning fabrics are rolled off from a supply roll, brought into contact with the cylinders to be cleaned, and finally rolled up onto a take-up roll or disposed of immediately.

A drawback with conventional cleaning fabrics is that ink residues often leak through the fabric from one side to the other. An example of a prior art document disclosing a cleaning cloth attempting to hold the ink it has absorbed can be found for instance in EP0414909A1. The cleaning cloth comprises an oil absorptive layer and an oil impermeable layer coating the oil absorptive layer except for on a portion which comes into contact with the ink roller to be cleaned. The cleaning cloth automatically absorbs ink remaining on the ink roller train and is then disposed of.

In the example above, as well as in the general prior art, the cleaning fabrics can only be used once before being discarded. As a result, an unnecessary amount of cleaning fabric is wasted after only a one-time use, which is both expensive for the customer making use of the cleaning fabric, as well as associated with a negative environmental impact. Hence, it is understood that there is room for improvements.

SUMMARY

An object of the present invention is to solve or at least mitigate the problems related to prior art. This object is achieved by means of the technique set forth in the appended independent claims; preferred embodiments being defined in the related dependent claims.

In a first aspect, a printing system cleaning fabric is provided, comprising a first layer having a first cleaning surface, and a second layer having a second cleaning surface facing away from the first cleaning surface. The first and second layers extend parallel to each other and have a respective inner surface attached to the other along an extension of the cleaning fabric. Moreover, the first and second layers have different permeability characteristics.

Different permeability characteristics of the first and second layers, respectively, is favourable in that the first layer is adapted to not leak through a substance or residue to be absorbed by the cleaning fabric, to the second layer, whereas the second layer of the cleaning fabric may absorb the same substance or residue and enable the diffusion of the same to the first layer. This way, the permeability of the first layer may provide a clean second surface such that the cleaning fabric may be reused.

The structure of the cleaning fabric is advantageous in that it may be used twice during a cleaning cycle. In other words, there is twice as much cleaning possibilities from one cleaning fabric roll. This leads to less waste, and at the same time, only half as much volume of used cleaning fabric needs to be handled after use, which is both better from an environmental point of view and well as for the customer.

In one embodiment, the first and second layers are made of any one of nonwoven and woven materials, or a combination thereof.

The first and second layers of the cleaning fabric may be impregnated with a cleaning composition.

In another embodiment, when in use, the first and second cleaning surfaces of the cleaning fabric are configured to engage with a surface of an object to be cleaned and remove residues from the surface of the object to be cleaned.

In yet a further embodiment, the first and second layers of the cleaning fabric have a different fiber composition, fiber density and/or thickness.

In another embodiment, the first layer comprises an absorbent layer configured to absorb residues from the surface of the object to be cleaned and prevent the transfer of the same to the second layer.

In one embodiment, the second layer comprises an absorbent layer configured to absorb residues from the surface of the object to be cleaned and transfer the same to the first layer.

The second layer may further comprise an additional absorbent layer.

In another embodiment, the cleaning fabric further comprises an intermediate layer interposed between said first and second layers. Such an intermediate layer may comprise a polymeric material. The intermediate layer thus forms a barrier between the first and second layer and prevents water and/or residues from being transferred from one layer to the other. In such case, the first and second layers may be provided as very thin layers.

The cleaning fabric may be an elongated, flexible web of material configured to be wrapped around a core to form a roll.

In a second aspect, a printing system cleaning machine adapted for cleaning a rotating cylinder is provided. The cleaning machine comprises a cleaning fabric roll including a core around which the cleaning fabric according to what has been described above is wrapped, and collecting roller around which used cleaning fabric can be wrapped. The cleaning fabric roll is arranged upstream of a rotating cylinder to be cleaned and the collecting roller is arranged downstream of the rotating cylinder to be cleaned. The cleaning fabric roll and the collecting roller are configured to be interchanged at their respective positions when a first cleaning surface of the first layer has been used.

In a third aspect, a roll of cleaning fabric to be used in a printing system cleaning machine according to above is provided. The roll comprises the cleaning fabric and the core onto which the cleaning fabric is wound.

In a fourth aspect, a method of cleaning a rotating cylinder of a printing system is provided. The rotating cylinder is cleaned with a printing system cleaning machine having a cleaning fabric roll including a core around which the cleaning fabric is wrapped, and a collecting roller. The method of cleaning comprises the steps of feeding the cleaning fabric from the cleaning fabric roll towards a rotating cylinder to be cleaned; arranging a first cleaning surface of the cleaning fabric in contact with the rotating cylinder to be cleaned; wrapping the cleaning fabric used on its first cleaning surface onto the collecting roller, which is arranged downstream of the rotating cylinder, until the core of the cleaning fabric roll is at least partially exposed; and—when the entire used cleaning fabric has been wound onto the collecting roller—replacing the core of the used cleaning fabric roll with the collecting roller comprising the cleaning fabric used on its first cleaning surface.

In an embodiment, the method of cleaning the rotating cylinder further comprises the steps of feeding the cleaning fabric used on its first cleaning surface from the collecting roller towards the rotating cylinder to be cleaned; placing a second cleaning surface of the cleaning fabric in contact with the rotating cylinder to be cleaned; and wrapping the cleaning fabric hereby used on both the first cleaning surface and the second cleaning surface onto the core arranged downstream of the rotating cylinder.

In a fifth aspect, the use of a cleaning fabric is provided, where the cleaning fabric is used for cleaning a rotating cylinder included in a printing system according to what has been described above.

An idea behind the invention is to provide a cleaning fabric or cloth that may be used twice, by simply moving the used cleaning fabric from a take-up position to a feeding position of the roll of cleaning fabric, and then cleaning with the other, uncontaminated side of the already used cleaning fabric.

BRIEF DESCRIPTION OF THE DRAWINGS

By way of example, embodiments of the present invention will now be described with reference to the accompanying drawings, in which.

DETAILED DESCRIPTION OF EMBODIMENTS

In the following, a description related to the cleaning of cylinders in printing presses will be described. However, it is to be noted that the different concepts described below are applicable to different types of applications involving rotating cylinders in general, such as other types of roll-to-roll operations.

Figure 1:
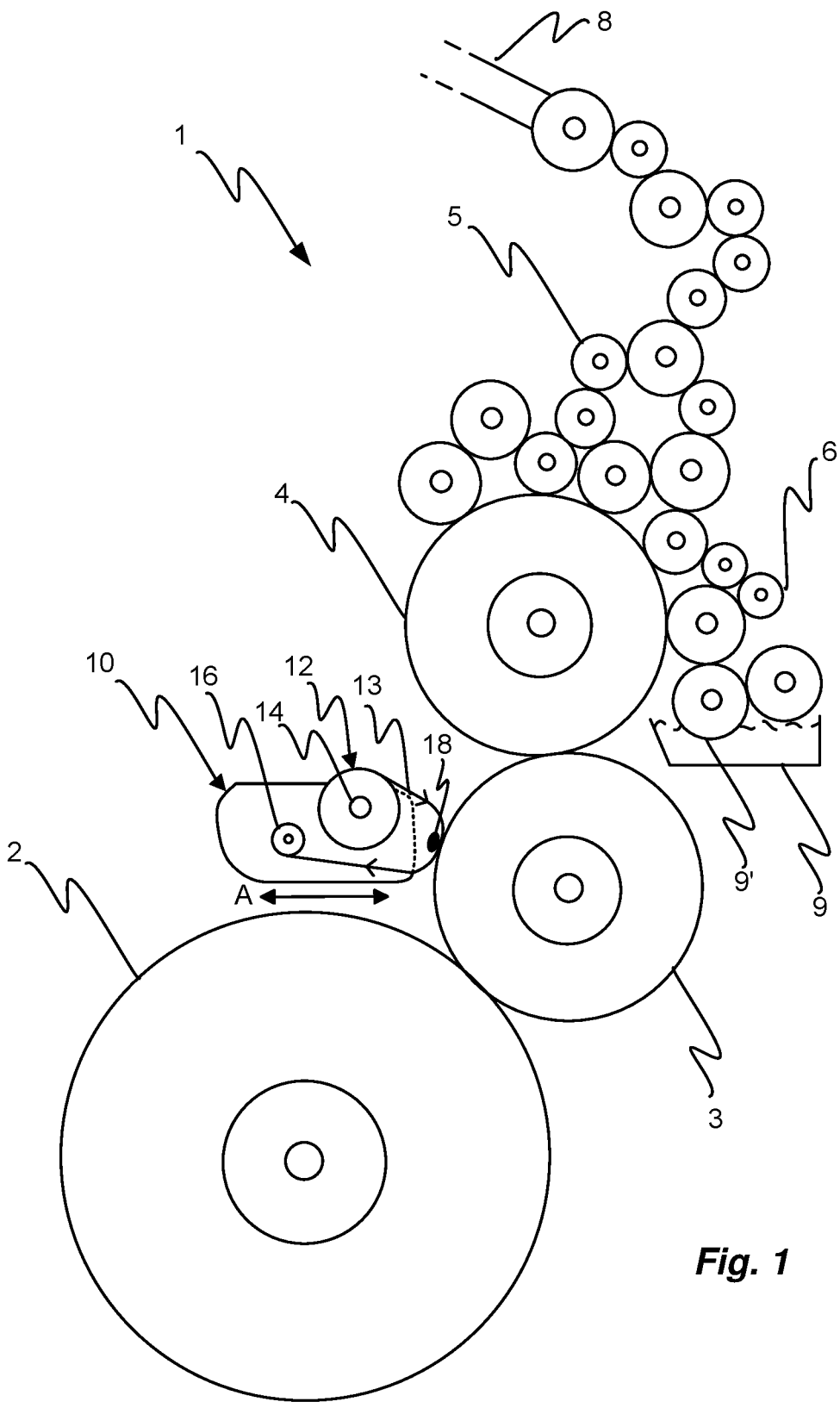
FIG. 1 shows a cross section of a general printing system with a set-up of roller and printing cylinders, and a cleaning machine with a cleaning cloth according to an embodiment.

With reference to FIG. 1, a general printing unit or system 1 with a number of printing cylinders and rollers 2, 3, 4, 5, 6 is illustrated. The printing system 1 described herein has an impression cylinder 2, i.e. which may be the largest printing cylinder, a blanket cylinder 3, i.e. the medium sized cylinder juxtaposed with the impression cylinder as shown in FIG. 1, which has a blanket, such as a rubber sheet (not shown) and a plate cylinder 4, i.e. the medium sized cylinder juxtaposed with the blanket cylinder 3. The blanket is commonly approximately 2 mm thick. The printing system 1 further has a number of inking rollers 5, which are small rollers not being damping rollers and a number of damping rollers 6, shown as five smaller circles in FIG. 1. The set of inking rollers 5 may be associated with an ink source 8, which provides the inking rollers 5 with ink. The set of damping rollers 6 may be associated with a damping source, in this case a water bath 9, which provides the damping rollers 6 with water.

When the printing system 1 is performing printing work, which is also described in Applicant's own application EP3582970A1, water is transported towards the cylinders via the damping rollers 6, which collect water from the damping source 9. The water thus arrives and is present at the non-pressured surfaces occurring between the cylinders 2, 3, 4. Ink is then transported by means of the ink rollers 5 which collect ink from the ink source 8, towards the cylinders 2, 3, 4. The print is then transferred to the blanket cylinder 3 and the material, e.g. paper. The material, which is to receive the print, is arranged between the rubber sheet (not shown) on the blanket cylinder 3 and the impression cylinder 2. This is where the printing work is conducted and the print is transferred from the rubber sheet to the material. The set-up of the cylinders and rollers shown and described herein is only an example of a set-up of a printing system.

The printing cylinders have to be cleaned regularly. This is performed by means of a cleaning machine or cassette 10 which houses a cleaning roll 12 with a cleaning fabric 13, also referred to as a cleaning cloth. Typically, the cleaning fabric 13 is soaked with a cleaning composition or liquid. Preferably, the cleaning fabric 13 is pre-soaked or pre-impregnated with such cleaning liquid before a roll 14 comprising the cleaning fabric 13 is arranged in the cleaning machine 10. Details on the cleaning fabric 13 and the cleaning liquid will be described further below.

During washing, the cylinders 2, 3, 4, 5, 6 are rotated in the opposite direction of that when using the printing system for printing. The cleaning composition will thus be transferred from the cleaning fabric 13 onto the rubber sheet (not shown) of the cylinder 3 and further onto the remaining cylinders 2, 4, 5, 6 of the printing system 1.

Figure 2:
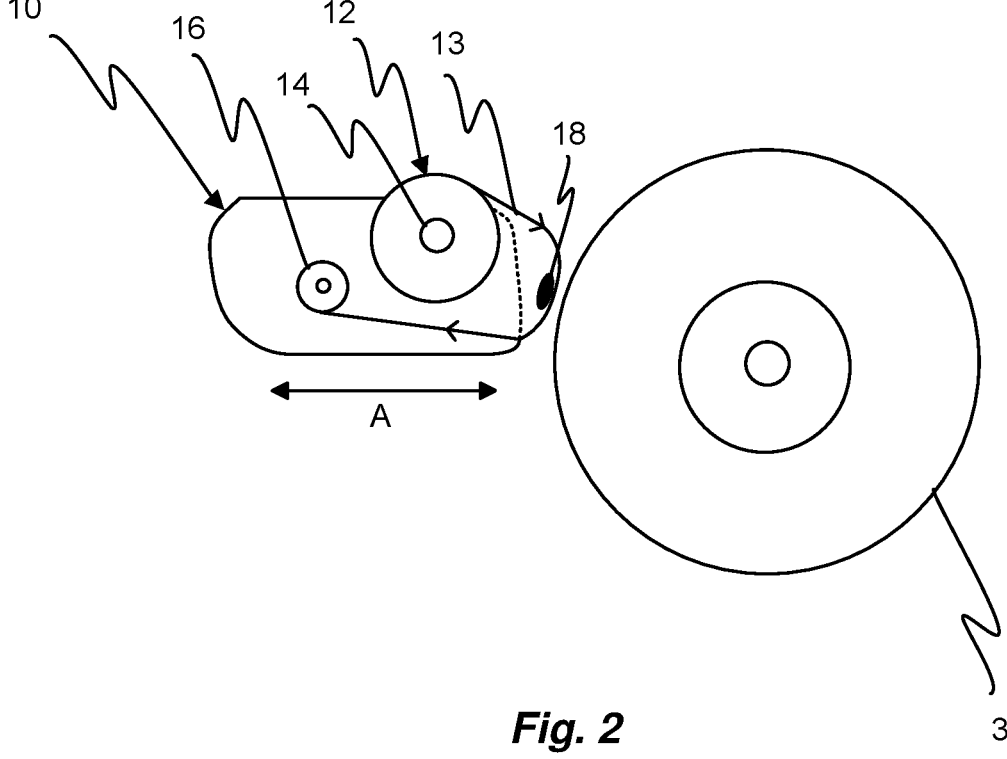
FIG. 2 shows an enlarged portion of FIG. 1.

FIG. 2 shows the cleaning cassette 10 of the printing system 1 shown in FIG. 1. The cleaning cassette 10 comprises the cleaning roll 12 which includes a bobbin or core 14. The cleaning fabric 13 is an elongated web of material configured to be wrapped around the core 14 to form a cleaning roll 12. The core 14 can be solid or hollow and made of any suitable material, for example plastic, paper or metal. The core 14 may also have different design of the cross sections, whereas the design described herein has a circular cross section.

The cleaning cassette 10 of FIGS. 1 and 2 further comprises a collecting roller 16 around which used cleaning fabric 13 can be wrapped. The collecting roller 16 may also be referred to as a take-up roller. The cleaning fabric roll core 14 and the collecting roller 16 are configured to be interchanged at their respective positions when a first cleaning side of the fabric 13 has been used.

In FIGS. 1 and 2, the cleaning roll 12 is positioned upstream of the printing cylinder 3 to be cleaned and the collecting roller 16 is positioned downstream of the printing cylinder 3 to be cleaned.

The cleaning cassette 10 may be any type of suitable cleaning machine used for the purpose of cleaning rotating cylinders. As illustrated by the double sided arrow A in FIGS. 1 and 2, the cleaning cassette 10 is movable between an idle position, in which the cleaning fabric 13 is not in contact with the object to be cleaned, i.e. the cylinder 3 in this example, to an active position in which the cleaning fabric 13 is in contact with the cylinder 3. The printing system 1 includes means (not shown) for performing the reciprocating movement of the cleaning cassette 10 between the idle and active positions. In certain embodiments (not shown), the cleaning cassette 10 with the cleaning fabric 13 may also be brought into contact with other cylinders of the printing system, such as the impression cylinder 2 and/or the plate cylinder 4.

According to an embodiment (not shown), after having performed cleaning on the surface of the printing cylinder 3, the cleaning fabric 13 will be unwrapped from the cleaning roll 12 onto the collecting roller 16 such that the bobbin 14 of the cleaning roll 12 is exposed. At this point, only one side of the cleaning fabric 13 has been used. Afterwards, the bobbin 14 and the collecting roller 16 (now carrying the cleaning fabric 13) switch positions, from the downstream position of the collecting roller 16 shown in FIGS. 1 and 2, to the upstream position of the cleaning roll 12, such that a second side of the cleaning fabric 13 can be used. This means that the empty cleaning fabric roll 12 which has been stripped down to the core 14 may be replaced by the collecting roller 16 wrapped with the once-used cleaning fabric 13. This way, the same cleaning fabric 13 may be used twice, at first on a first side and subsequently on a second side thereof. Hence, instead of using the cleaning fabric 13 only once, it may according to the inventive concept be reused before it is discarded due to the structure of the cleaning fabric 13, which will now be described in detail in relation to FIGS. 3-6.

Figure 3:
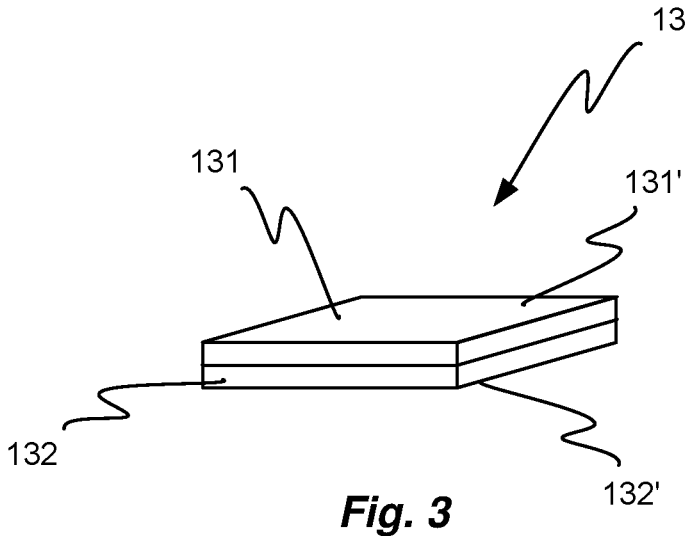
FIG. 3 is a perspective view of a cleaning cloth according to an embodiment.
Figure 4:
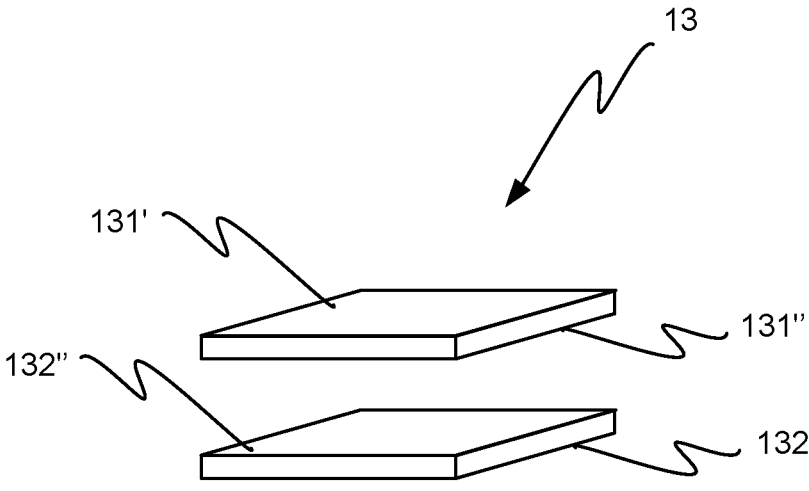
FIG. 4 is an exploded view of a cleaning cloth according to the embodiment shown in FIG. 3.

In FIGS. 3 and 4, a cleaning fabric 13 according to an embodiment is shown schematically. The cleaning fabric 13 is an elongated, flexible web of material configured to be wrapped around a core to form a roll.

Referring to FIGS. 3 and 4, the cleaning fabric 13 has a first layer 131 with a first cleaning surface 131', and a second layer 132 with a second cleaning surface 132'. The first cleaning surface 131' faces away from the second cleaning surface 132'. The cleaning surfaces 131', 132' may also be referred to as the first and second sides of the cleaning fabric 13, respectively. The cleaning surfaces 131', 132' are outer surfaces of the cleaning fabric 13.

Both cleaning surfaces 131', 132', of the cleaning fabric 13 are respectively configured to engage with a surface of an object to be cleaned, to remove residues from the surface. The object to be cleaned is typically a rotating cylinder. In the non-limiting examples disclosed herein, the object to be cleaned is primarily a blanket cylinder and/or an impression cylinder in a printing system. The residues may for instance be ink, calcium carbonate, a binding agent, a fountain solution, lint, fabric debris or the like.

As illustrated schematically, the first and second layers 131, 132 extend parallel to each other and have a respective inner surface 131", 132" attached to the other along an extension of the cleaning fabric 13. Put differently, the first layer 131 has an inner surface 131" opposite the first cleaning surface 131', and the second layer 132 has an inner surface 132" opposite the second cleaning surface 132'. The inner surfaces 131", 132" of the first and second layers 131, 132 face each other and are attached to each other along the length of the cleaning fabric 13. They may for instance be attached to each other by hydroentanglement, or water entanglement, ultrasonic pattern bonding, thermal bonding, UV radiation, or the like.

Preferably, the first layer 131 and the second layer 132 together have a thickness being at most 50% thicker than a conventional cleaning fabric known in the art. Such known cleaning fabric may have a thickness in the range of 0.2 to 0.3 mm, such as 0.23 to 0.29 mm. Hence, the cleaning fabric 13 comprising the first layer 131, and the second layer 132 may have a thickness in the range of 0.3 to 0.45 mm.

The first and second layers 131, 132 may comprise fibres of polyethylene terephthalate (PET) and/or paper fibres.

Preferably, the first and second layers 131, 132 have different permeability characteristics. For instance, the first layer 131 is permeable to such an extent that a residue, as mentioned above, absorbed in a cleaning process is not transferable to the second layer 132. In other words, the first layer 131 is impermeable to at least one of the residues (as described above) present on the surface to be cleaned. An effect of this is that the second layer 132 remains untarnished and thus clean for subsequent use, even though the cleaning fabric 13 has already been used on a first side 131' thereof. This means that the second layer 132 is still white enough to pass as a new cleaning surface in a system using sensors to control the cleaning process.

For instance, the second layer 132 may have a permeability that is higher than the first layer 131, such that when the second layer 132 is used for cleaning off an ink residue from the surface of a cylinder to be cleaned, the ink can be transferred to the first layer 131, which has already been used. This way, the cleaning fabric 13 has been used twice thanks to the different permeability characteristics of the first and second layers 131, 132. In general, the first side 131' is used at first, before the second side 132' is used. Different types of PET fibres having different properties may be used in the first and second layers 131, 132 to affect the permeability of the layers 131, 132.

Notably, the first and second layers 131, 132 of the cleaning fabric 13 may have the same, or different, absorptive characteristics. In other words, the first and second layers 131, 132 may absorb the residue equally well but have a different permeability to the residue. Typically, the first layer 131 has an absorbent layer configured to absorb residues from the surface of the object to be cleaned and prevent the transfer of the same to the second layer 132. Conversely, the second layer 132 has an absorbent layer configured to absorb residues from the surface of the object to be cleaned and transfer the same to the first layer 131.

The absorptive characteristics are affected by for instance the porosity of the first and second layers 131, 132. A more porous material results in a higher absorption. A combination of paper fibres and PET fibres also affect the absorption.

Moreover, the second layer 132 may have an additional absorbent layer (not shown) to withstand the pressure of a pressure pad, such as a rubber pad 18, which is pressed against the cleaning fabric 13 during the cleaning process. This way, a cleaning composition comprised in the cleaning fabric 13 is kept in the second layer 132 for subsequent use of the cleaning fabric 13.

In one embodiment, the cleaning fabric 13 has more than two layers 131, 132, such as three or four layers (not shown).

Typically, the first and second layers 131, 132 are made of a nonwoven material, or a woven material, or a combination of the two. The different layers of the cleaning fabric may have a different fiber composition, fiber density and/or thickness.

The thickness of the cleaning fabric 13 may be up to 35% greater than the thickness of conventional cleaning fabrics. For instance, the thickness of the cleaning fabric 13 may range between 0.20 and 0.80 mm, preferably between 0.25 and 0.60, more preferably between 0.25 and 40 mm, and most preferred between 0.25 and 0.35 mm. Moreover, the cleaning fabric 13 may be calendered or non-calendered.

In order to have a cleaning property, the first and second layers 131, 132 of the cleaning fabric 13 are impregnated or pre-soaked with a cleaning composition or liquid. The cleaning composition may for instance be of the type disclosed in Applicant's own patent application WO2020/035499A1. Typically, the cleaning liquid comprises at least one organic solvent to dilute and/or dissolve for instance ink residues, and at least one cellulose solubilizer configured to dissolve cellulosic material such as paper debris from the cylinders to be cleaned. Other examples of residues that may be cleaned off the rotating cylinders have already been mentioned above. Preferably, the cellulosic solubilizer should be a low volatile organic compound (low VOC, or non-VOC).

In addition to what has been described above, the cleaning fabric 13 may further comprise an intermediate layer interposed between the first and second layers. This is schematically illustrated in relation to FIGS. 5 and 6. The cleaning fabric 13 may also have more than three layers.

Figure 5:
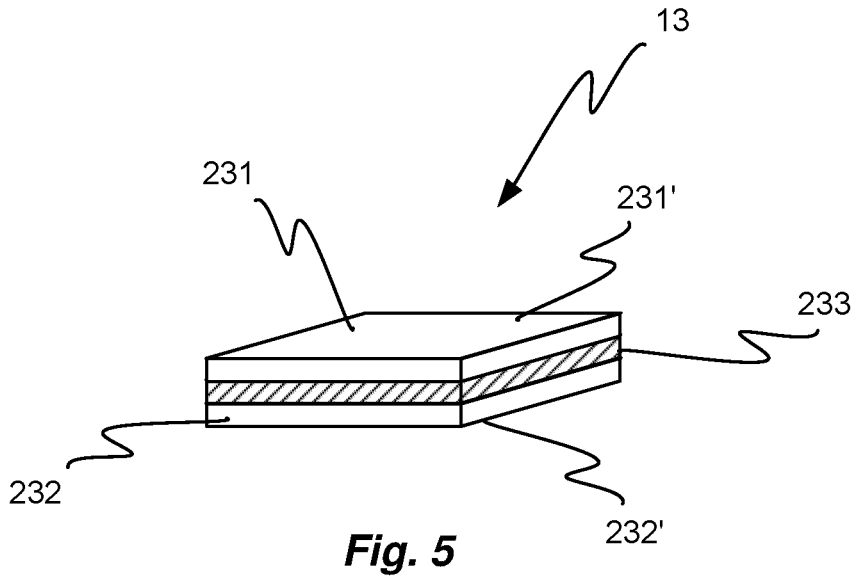
FIG. 5 is a perspective view of a cleaning cloth according to another embodiment.
Figure 6:
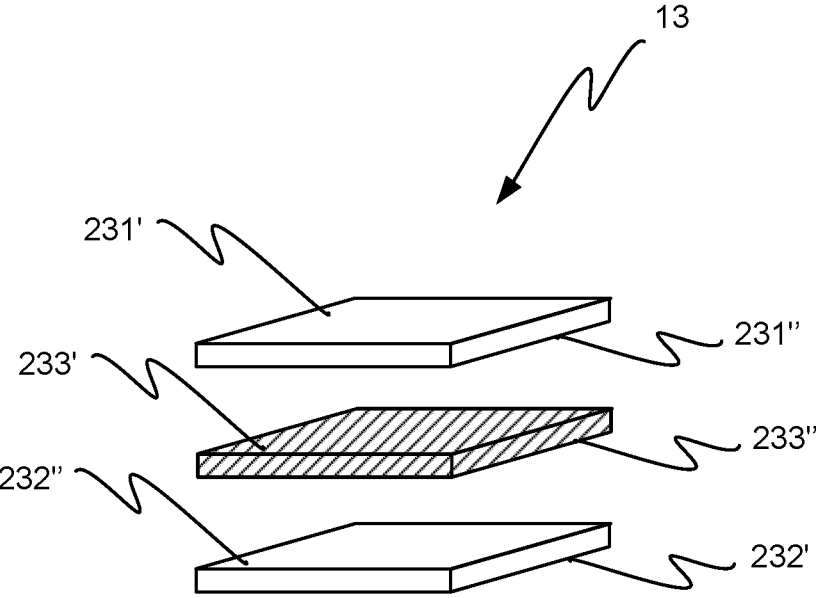
FIG. 6 is an exploded view of a cleaning cloth according to the embodiment shown in FIG. 5.

As shown in FIGS. 5 and 6, the cleaning fabric 13 has a three-layer structure with a first layer 231, a second layer 232 and an intermediate layer 233 interposed between the first and second layers 231, 232. Seen from a cross-section view, the cleaning fabric 13 has a substantially sandwich-like structure. The thickness of the intermediate layer 233 may be different from those of the first and second layers 231, 232. For instance, the thickness of the intermediate layer 233 is substantially thinner than the first and second layers 231, 232. Together, the different layers 231-233 may be seen as a sheet-like, laminate structure. Alternatively, the first and second layers 231, 232 are thinner than the intermediate layer 233. The first and second layers 231, 232 may have different thicknesses.

Preferably, the first layer, the intermediate layer and the second layer together have a thickness being at most 50% thicker than a conventional cleaning fabric known in the art. Such known cleaning fabric may have a thickness in the range of 0.2 to 0.3 mm, such as 0.23 to 0.29 mm. Hence, the cleaning fabric 13 comprising the first layer 231, the second layer 232 and the intermediate layer 233 may have a thickness in the range of 0.3 to 0.45 mm. The intermediate layer 233 is very thin, allowing for a first layer 231 and a second layer 232 having about the same thickness as the first layer 131 and second layer 232 of the cleaning fabric 13 shown in FIGS. 3 and 4.

The intermediate layer 233, preferably is or comprises a polymeric material, such as a thin plastic film. The intermediate layer 233 is adapted to be impermeable to the residue which is to be absorbed into the cleaning fabric 13 from the surface of the rotating cylinder to be cleaned. For instance, the intermediate layer 233, which may also be called a barrier, is impermeable to at least one of the residues mentioned previously. This way, when a first side 231' (shown in FIG. 5) of the cleaning fabric 13 has been used to clean the surface of a printing cylinder, the residues absorbed in the first layer 231, will be prevented from diffusing into and contaminating the second layer 232 of the cleaning fabric 13, and vice versa. Put differently, when using a barrier layer 233, the residue(s) absorbed in the first and second layers 231, 232 of the cleaning fabric 13, respectively, cannot spread to the other layer. The other side is thus kept clean for subsequent use. After the cleaning fabric 13 has been used on both sides, it may be discarded.

As illustrated in FIG. 5, the first layer 231 has a first cleaning surface 231' and the second layer 232 has a second cleaning surface 232' facing away from the first cleaning surface 231'. The cleaning surfaces 231', 232' may also be referred to as the first and second sides of the cleaning fabric 13, respectively. Both sides 231', 232' of the cleaning fabric 13 are configured to engage with a surface of the object to be cleaned. The cleaning surfaces 231', 232' are outer surfaces of the cleaning fabric 13. In addition to being able to clean a surface with both sides 231', 232' of the cleaning fabric 13 when providing an intermediate layer 233, the first and second layers 231, 232 may be provided as relatively thin layers. This reduces the weight of the cleaning fabric 13. Thin layers further results in a less expensive production and cheaper transport due to lowered weight.

Furthermore, as illustrated in FIG. 6, the first and second layers 231, 232 of the cleaning fabric 13 have corresponding inner surfaces 231'', 232'', which are arranged to be attached to matching surfaces 233', 233'' of the intermediate layer 233, respectively. The surfaces 231'', 233' and 232'', 233'' may be attached to each other, preferably by means of any one of an adhesive, melting, welding, or the like.

Hence, the cleaning fabric 13 in FIGS. 5 and 6 comprises a first layer 231, a second layer 232 and an intermediate layer 233 interposed between the first and second layers 231, 232, wherein the first layer 231 has a first cleaning surface 231' and the second layer 232 has a second cleaning surface 232' facing away from said first cleaning surface 231', and wherein the intermediate layer 233 is impermeable to residue which is to be absorbed into the cleaning fabric 13 from the surface to be cleaned. The first layer 231, the second layer 232 and the intermediate layer 233 extend parallel to each other.

The cleaning fabric 13 described herein may comprise additional layers than those described. For instance, the cleaning fabric 13 may comprise a layer comprising a cleaning liquid encapsulated in micro capsules. Once the cleaning fabric 13 is subjected to a pressure force, such as when the cleaning fabric 13 is pressed against the cylinder to be cleaned, the cleaning liquid is released from the capsules.

Now that all features of the cleaning fabric have been described, the following can be said about the concept of the reusability of the cleaning fabric. After the first side of the cleaning fabric has been used, the cleaning fabric roll arranged upstream of a printing cylinder to be cleaned and the take-up roller arranged downstream of the printing cylinder to be cleaned are interchanged at their respective positions. When the cleaning fabric wrapped around the take-up roller, and the cleaning fabric roll, now stripped down to the core, have switched positions, the second side of the second layer of the used cleaning fabric is exposed for subsequent use. This allows for a more environmentally friendly fabric that may be used twice before it is thrown away. Moreover, due to the difference in permeability of the different layers, the second side, i.e. the second cleaning surface, is kept clean after the first side has been used, since no residue can penetrate the second layer from the first layer when the first layer is or has been used.

Figure 7:
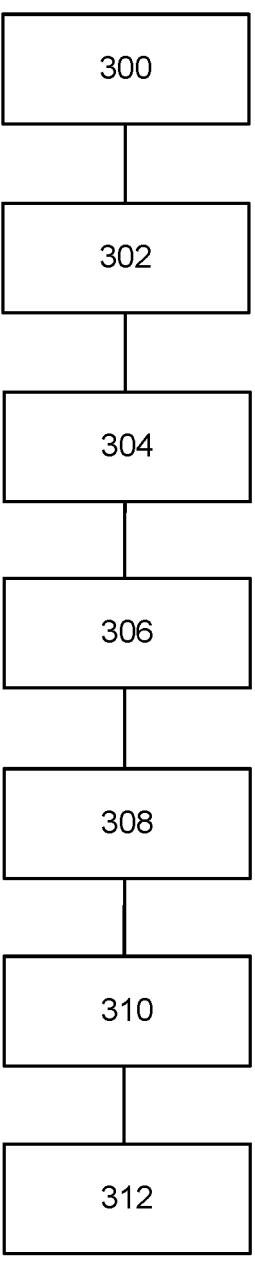
FIG. 7 is a schematic block diagram of a cleaning method according to an embodiment.

Referring now to FIG. 7, a method for cleaning printing cylinders of a printing system will now be described. A cleaning fabric roll 12 including a core 14 around which the cleaning fabric 13 according to what has previously described is wrapped, and a take-up roller 16 are used for the cleaning process. The cleaning fabric 13 has been impregnated or pre-soaked with a cleaning composition.

The cleaning method includes feeding 300 the cleaning fabric 13 from the cleaning fabric roll 12 towards a rotating cylinder 3 to be cleaned. Next, the method includes placing 302 a first cleaning surface or side 131', 231' of the cleaning fabric 13 in contact with the rotating cylinder 3 to be cleaned. This may be done by moving the cleaning fabric 13 into abutment with a surface on the cylinder 3 to be cleaned. The method further comprises a step of wrapping 304 the once used cleaning fabric 13 onto a take-up roller 16, or collecting roller, which is arranged downstream of the rotating cylinder 3, until the core 14 is exposed, or uncovered, at least partially. When the entire once used cleaning fabric 13 has been wound onto the take-up roller 16, a step of replacing 306 the uncovered core 14 of the used cleaning fabric roll 12 with the take-up roller 16 comprising the used cleaning fabric 13, takes place. Put differently, the step of replacing 306 the naked core 14 of the unwrapped cleaning fabric roll 12 arranged upstream of the printing cylinder to be cleaned and the take-up roller 16 arranged downstream of the printing cylinder to be cleaned may be regarded as a change of their respective positions when the first side 131', 231' of the first layer 131, 231 of the cleaning fabric 13 has been used.

Moreover, the method includes the steps of feeding 308 the once used cleaning fabric 13 from the take-up roller 16 towards a rotating cylinder to be cleaned, placing 310 a non-used second side 132', 232' of the cleaning fabric 13 in contact with the rotating cylinder to be cleaned, and finally, downstream of the printing cylinder to be cleaned, wrapping 312 the twice used cleaning fabric 13 onto the uncovered core 14 which will now be covered once again. At this point, both sides 131', 231'; 132', 231' of the cleaning fabric 13 have been used and the customer buying the roll has saved money and time on buying an extra roll of cleaning fabric.

A different way of describing the method is as follows. In a first step, the cleaning fabric 13 having two cleaning sides is wound up on a bobbin or core 14, to form a supply roll, such as the cleaning roll 12. Optionally, the cleaning roll 12 is already provided as a supply roll when it is mounted in its position of use, which is upstream of the printing cylinder to be cleaned. Then, the cleaning fabric 13 is unwound from the cleaning roll 12 and directed in a direction towards the cylinder 3 to be cleaned. Next, thanks to the cleaning fabric 13 being impregnated with a cleaning liquid, it cleans the cylinder with its first cleaning side 131', 231'. After cleaning the printing cylinder, the once used cleaning fabric 13 is wound up on an empty take-up roller 16, which eventually forms a take-up roll which may be used in a subsequent cleaning process where the second, uncontaminated cleaning side 132', 232' of the fabric 13 may be used. When the first side 131', 231' of the cleaning fabric 13 has been used, the supply roll, which is now stripped down to its core 14, is removed from its position of use and replaced by the so formed take-up roll 16. Then, the cleaning process is repeated with the clean side of the cleaning cloth—i.e. the non-used second side 132', 232'—coming into contact with the printing cylinder to be cleaned. Hence, the cleaning fabric may be used twice for cleaning.

Finally, although the inventive concept has been described above with reference to specific embodiments, it is not intended to be limited to the specific form set forth herein. Rather, the inventive concept is limited only by the accompanying claims and other embodiments than the ones above are equally possible within the scope of these appended claims.

The invention claimed is:

1. A printing system cleaning fabric for cleaning a rotating cylinder of a printing system, the cleaning fabric comprising: a first layer, a second layer, and an intermediate layer interposed between the first and second layers, the first layer having a first cleaning surface, the second layer having a second cleaning surface facing away from said first cleaning surface, the intermediate layer being impermeable to residue which is to be absorbed into the cleaning fabric from the rotating cylinder to be cleaned;

wherein the first layer, the second layer, and the intermediate layer extend parallel to each other; and wherein the cleaning fabric is an elongated, flexible web of material configured to be wrapped around a first roller and around a second roller in a manner such that the cleaning fabric has first and second configurations relative to the rotating cylinder of the printing system when used in the printing system, wherein when in the first configuration, the cleaning fabric is wound about the first roller in a manner so as to extend from the first roller upstream of the rotating cylinder to be cleaned to the second roller downstream of the rotating cylinder to be cleaned with the first cleaning surface of the first layer of the cleaning fabric arranged to contact the rotating cylinder to be cleaned, and wherein when in the second configuration, the cleaning fabric is wound about the second roller in a manner so as to extend from the second roller upstream of the rotating cylinder to be cleaned to the first roller downstream of the rotating cylinder to be cleaned with the second cleaning surface of the second layer of the cleaning fabric arranged to contact the rotating cylinder to be cleaned.

2. The printing system cleaning fabric according to claim 1, wherein said first and second layers are made of any one of nonwoven and woven materials, or a combination thereof.

3. The printing system cleaning fabric according to claim 1, wherein the first and second layers of the cleaning fabric are impregnated with a cleaning composition.

4. The printing system cleaning fabric according to claim 1, wherein the first and second layers of the cleaning fabric have at least one of a different fiber composition, fiber density and thickness.

5. The printing system cleaning fabric according to claim 1, wherein the intermediate layer comprises a plastic film.

6. The printing system cleaning fabric according to claim 1, wherein the cleaning fabric is an elongated, flexible web of material configured to be wrapped around a core to form a roll.

7. The printing system cleaning fabric according to claim 1, wherein the cleaning fabric has a thickness in the range of 0.20 mm to 0.80 mm.

8. The printing system cleaning fabric according to claim 1, wherein the cleaning fabric comprises a layer comprising a cleaning liquid encapsulated in micro capsules.

9. The printing system cleaning fabric according to claim 1, wherein the intermediate layer has a thickness less than a thickness of at least one of the first layer and the second layer.

10. A printing system cleaning machine adapted for cleaning a rotating cylinder, the cleaning machine comprising:

(i) a cleaning fabric roll including a core;

(ii) a cleaning fabric wound around the core of the cleaning fabric roll, the cleaning fabric comprising a first layer having a first cleaning surface, a second layer having a second cleaning surface facing away from said first cleaning surface, and an intermediate layer interposed between the first and second layers, the intermediate layer being impermeable to residue which is to be absorbed into the cleaning fabric from the rotating cylinder to be cleaned, the first layer, the second layer, and the intermediate layer extending parallel to each other; and (iii) a collecting roller adapted and configured to wind used cleaning fabric;

wherein when the first cleaning surface of the first layer contacts the rotating cylinder to be cleaned, the cleaning fabric roll is arranged upstream of the rotating cylinder to be cleaned and the collecting roller is arranged downstream of the rotating cylinder to be cleaned, the cleaning fabric roll and the collecting roller are configured to be interchanged at their respective positions when the first cleaning surface of the first layer has been used such that when the second cleaning surface of the second layer contacts the rotating cylinder to be cleaned, the cleaning fabric roll is arranged downstream of the rotating cylinder to be cleaned and the collecting roller is arranged upstream of the rotating cylinder to be cleaned.

11. A roll of the cleaning fabric used in the printing system cleaning machine according to claim 10, wherein the roll is one of the collecting roller and the cleaning fabric roll.

12. The printing system cleaning machine according to claim 10, wherein the intermediate layer of the cleaning fabric has a thickness less than a thickness of at least one of the first layer of the cleaning fabric and the second layer of the cleaning fabric.

13. The printing system cleaning machine according to claim 10, wherein the intermediate layer of the cleaning fabric comprises a plastic film.

14. A method of cleaning a rotating cylinder of a printing system with a printing system cleaning machine, wherein the cleaning machine comprises (i) a cleaning fabric roll including a core, (ii) a cleaning fabric wound around the core of the cleaning fabric roll, the cleaning fabric comprising a first layer having a first cleaning surface, a second layer having a second cleaning surface facing away from said first cleaning surface, and an intermediate layer interposed between the first and second layers, the intermediate layer being impermeable to residue which is to be absorbed into the cleaning fabric from the rotating cylinder to be cleaned, the first layer, the second layer, and the intermediate layer extending parallel to each other, and (iii) a collecting roller adapted and configured to wind used cleaning fabric, the method comprising the steps of:

feeding the cleaning fabric from the cleaning fabric roll towards a rotating cylinder to be cleaned;

arranging a first cleaning surface of the cleaning fabric in contact with said rotating cylinder to be cleaned;

wrapping the cleaning fabric used on its first cleaning surface onto the collecting roller, which is arranged downstream of the rotating cylinder, until the core of the cleaning fabric roll is at least partially exposed; and, when the entire used cleaning fabric has been wound onto the collecting roller, replacing said core of the used cleaning fabric roll with the collecting roller comprising the cleaning fabric used on its first cleaning surface.

15. The method of cleaning a rotating cylinder of a printing system according to claim 14, further comprising the steps of:

feeding the cleaning fabric used on its first cleaning surface from the collecting roller towards the rotating cylinder to be cleaned;

placing a second cleaning surface of the cleaning fabric in contact with said rotating cylinder to be cleaned; and wrapping the cleaning fabric used on both the first cleaning surface and the second cleaning surface onto the core arranged downstream of the rotating cylinder.

\* \* \* \* \*